June 19, 1951     O. B. DUTTON     2,557,817
ALTERNATING CURRENT FREQUENCY MEASURING
Filed Sept. 30, 1948
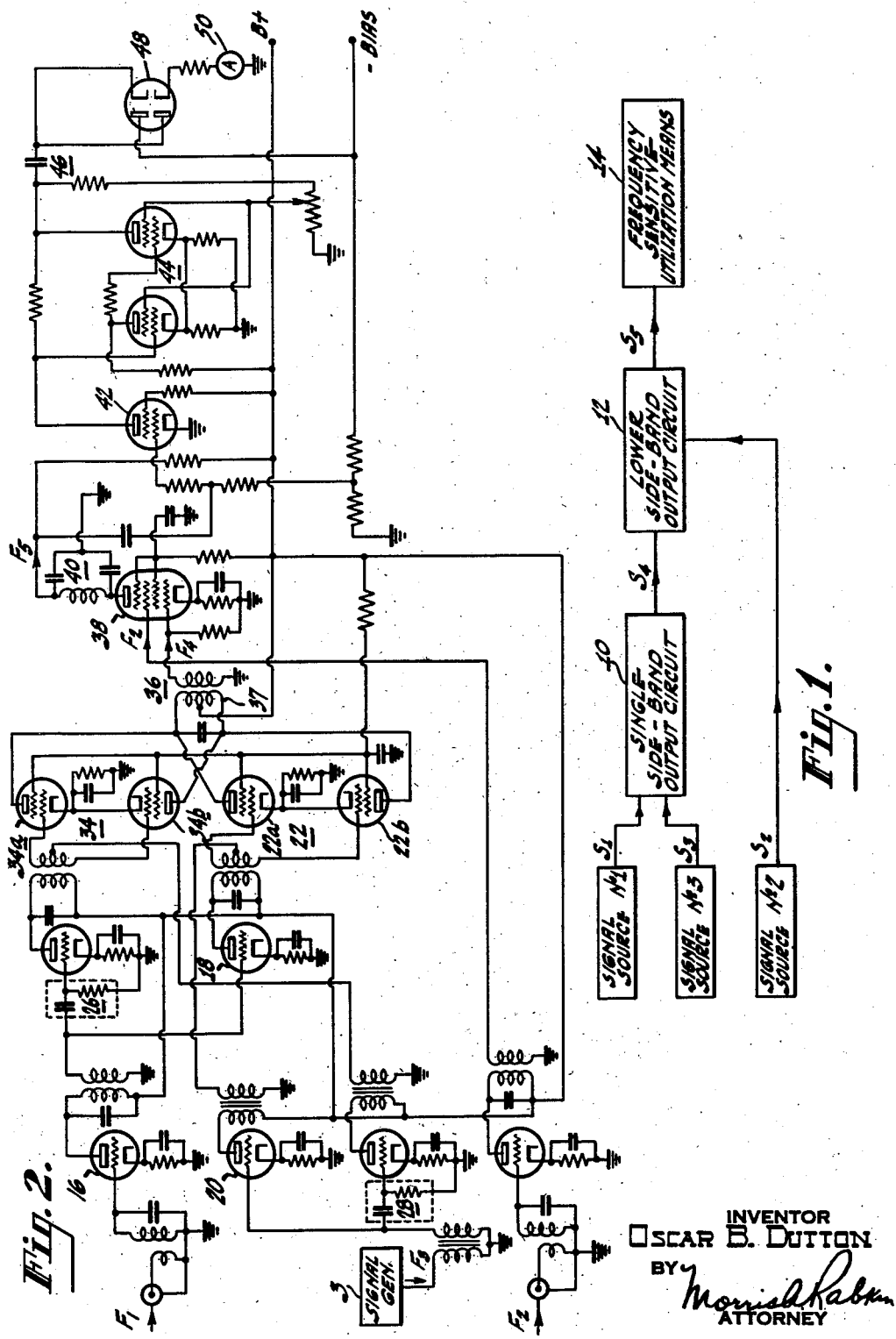
INVENTOR
OSCAR B. DUTTON
BY
ATTORNEY Patented June 19, 1951

2,557,817

UNITED STATES PATENT OFFICE 2,557,817

ALTERNATING CURRENT FREQUENCY MEASURING

Oscar B. Dutton, Erlton, N. J., assignor to Radio Corporation of America, a corporation of Delaware Application September 30, 1948, Serial No. 52,002

7 Claims. (Cl. 250—39)

This invention relates to improvements in the art of alternating current frequency measuring and, while not limited thereto, finds particular application in the measurement of deviation between signals of the same nominal frequency.

In the art of frequency measuring, it is common practice to combine a signal of unknown frequency with a signal of known frequency to obtain a "beat frequency" signal, and to determine the frequency of the unknown by measuring the beat, or difference in frequency, between the two signals. Very high frequencies may be measured with a high percentage of accuracy in this manner, and the relative advantages of using low frequency measuring instruments are also obtained.

A principal objection to the method just outlined resides in the fact that the operator must know, or be able to ascertain, whether the unknown signal is higher or lower in frequency than the reference signal at the time the measurement is made. There is nothing in the beat signal itself to give this information as to the direction of the deviation, unless one of the signals can be varied through the region of "zero beat" frequency, and without such information, the operator is unable to tell whether the measured beat frequency should be added to, or subtracted from, the reference. In certain applications, such as in the comparison of a crystal controlled oscillator with a reference master oscillator of the same nominal frequency as the crystal oscillator, it is ordinarily impossible to tell whether the reference signal or the unknown is higher in frequency, since neither of the oscillators can be varied in frequency conveniently. In such applications, some means must be provided for determining the direction, as well as the amount, of any deviation between the two signals.

It is one object of the present invention to provide improved methods and means for frequency measurements with A. C. signals.

Another object of the invention is the provision of improved methods and means for measuring frequency deviation.

A further object of the invention is to provide improved methods and devices for measuring both the magnitude and the direction of frequency deviations.

Another object of the invention is to provide improved methods and systems for making a frequency comparison between two signals of the same nominal frequency.

According to the invention, the foregoing and other objects and advantages are attained by combining two signals, whose comparative frequencies are of interest, with a third signal which has a much lower frequency than the first or second signal. The combination is made in two sequential steps to obtain a new signal having readily measureable frequency characteristics. In the initial step, the first and third signals are combined to produce a resultant signal which is a single side band (as defined hereinafter) of the combination of the first and third signals. This resultant signal is then combined with the second signal, and a final resultant signal is obtained which is the lower side-band of the combination of the third signal and the first-mentioned resultant signal. As will be explained hereinafter, the frequency of the final resultant signal will be dependent on the frequency difference between the first and second signals, and will also indicate which of the first and second signals is higher in frequency. The final resultant signal may be supplied to any suitable frequency-sensitive utilization means which will respond to different frequencies in any desired manner. Such means may include indicating instruments, alarm systems, control devices or any other utilization means having a frequency responsive mode of operation. Hence, the term "frequency measurement," as the expression is used herein and in the appended claims, is intended to include any and all frequency-responsive operations.

A more complete understanding of the invention may be had by reference to the following description of illustrative embodiments thereof when read in connection with the accompanying drawing, in which:

Figure 1 illustrates, in block diagram form, a system for frequency measurement arranged in accordance with the principles of the invention, and Figure 2 is a schematic diagram of a circuit for frequency deviation measurements, arranged in accordance with the invention.

Before proceeding with a discussion of the invention, certain terms, which have been adopted to simplify the discussion, will first be defined as they are to be used herein and in the appended claims. As is common practice in the discussion of modulation, or signal-mixing, phenomena, a signal whose frequency is equal to the sum of the frequencies of two combined signals will be referred to as the upper side band of the two combined signals, while a signal whose frequency is equal to the difference in frequency between two combined signals will be referred to as the lower side band of the two combined signals. Where it is immaterial whether the upper or lower side band be used, the signal will be referred to as a single side band. Many circuits for obtaining an upper or a lower side band output with a dual frequency input are well known in the art, and such circuits will be referred to, in general, as single side band output circuits. Where the output is specified as one or the other of the sidebands, the circuit will be designated as an upper or lower side band output circuit, as the case may be.

The invention will first be explained in connection with the block diagram of Figure 1, which illustrates a system for frequency measurement arranged in accordance with the invention. As was previously mentioned, it is contemplated that three signals $S_1$, $S_2$, and $S_3$ from any desired sources 1, 2, and 3, respectively, are to be combined in two sequential steps. To this end, signals $S_1$ and $S_3$ from two of the sources, 1 and 3, are first combined in a single side-band output circuit 10 to produce the single side-band resultant signal $S_4$. As will be explained hereinafter, the signal $S_4$ may be either the upper or the lower side band of the signals $S_1$ and $S_3$. In the second step, the resultant signal $S_4$ is combined with the signal $S_2$ in a lower side-band output circuit 12 to produce a new resultant signal $S_5$.

The signal $S_5$ is pased on to any desired frequency-sensitive utilization means 14, which might comprise an audio frequency meter, an automatic frequency control system (which might be coupled back to one of the signal sources 1, 2, or 3), a frequency controlled alarm system, or the like.

The desirable characteristics of the signal $S_5$ may be seen by considering its relation to the two original signals $S_1$ and $S_2$. As an example, it may be assumed that the signal source 1 is a reference signal generator of predetermined, fixed frequency $f_1$, and that it is desired to compare the frequency $f_2$ of a signal $S_2$ from a signal source 2 with the frequency of the signal $S_1$, where it is not known whether the frequency of the signal $S_2$ is greater than, or less than, the frequency of the reference signal $S_1$. The signal from the source $S_3$ should have a low frequency $f_3$, equal at least to the maximum expected difference in frequency between the signals $S_1$ and $S_2$.

If the two signals $S_1$ and $S_2$ were combined directly to obtain the lower side band or beat frequency signal of the two, there would be no way of determining whether the signal $S_2$ were higher or lower in frequency than the signal $S_1$. In the system shown in Figure 1, this problem does not arise. Assuming, for the purpose of discussion, that the single side band output circuit 10 will provide a lower side band output, then the frequency $f_4$ of the signal $S_4$ will be (1) $$f_4 = f_1 - f_3$$

It will also be seen that the frequency $f_5$ of the signal $S_5$ will be (2) $$f_5 = f_2 - f_4$$

From Equations 1 and 2, (3) $$f_5 = f_2 - (f_1 - f_3)$$

or (4) $$f_5 = f_2 - f_1 + f_3$$

From Equation 4, it will be apparent that when the frequencies of the signals $S_1$ and $S_2$ are equal, the frequency of the resultant signal $S_5$ is exactly equal to the frequency of the signal $S_3$. If the frequency $f_1$ is less than the frequency $f_2$, then the frequency $f_5$ of the resultant signal $S_5$ will be greater than the frequency $f_3$ by an amount equal to the difference between the frequencies $f_1$ and $f_2$. If the frequency $f_1$ is greater than the frequency $f_2$, then the frequency of the resultant signal $S_5$ will be less than the frequency $f_3$ by an amount equal to the difference between the frequencies $f_1$ and $f_2$. Therefore, the frequency of the resultant signal $S_5$ will be indicative of both the direction and the amount of deviation between the signals $S_1$ and $S_3$.

In Figure 2 of the drawing, there is shown a complete circuit, arranged in accordance with the invention, for the measurement and indication of frequency deviation between two signals. Referring to Figure 2, it may be assumed that it is desired to measure any difference in frequency which may exist between two signals $S_1$ and $S_2$, of the same nominal frequency, which are derived from any desired sources (not shown). An auxiliary signal source, such as a signal generator 3, is provided to furnish signals $S_3$ having a frequency $f_3$ equal to the maximum expected difference in frequency between the two signals $S_1$ and $S_2$.

While any desired type of single side band output circuit may be used to obtain the first resultant signal $S_4$, the arrangement of two balanced modulators which is shown in Figure 2 is considered preferable. The signals $S_1$ and $S_3$ may be applied to the two sections 22a and 22b of a balanced modulator 22 through suitable amplifiers, such as the amplifiers 16, 18 and 20, while the same signals $S_1$ and $S_3$ may be advanced in phase of 90° in the phase shift circuits 26 and 28, respectively, and then applied to the two sections 34a and 34b of a second balanced modulator 34. As is well known, the output signal of a single balanced modulator such as either of the modulators 22 or 34 of Figure 2, will, in general, comprise the upper and lower side-bands of the combined input signals, together with that input signal which is applied to the two sections of the modulator in phase opposition. The outputs of the two modulators 22, 34 are combined in a transformer 36, the primary winding 37 of which is common to both of the modulators 22, 34. Considering the signal $S_1$ to comprise a voltage $V \sin \omega t$, and the signal $S_3$ to comprise a voltage $M \sin \mu t$, the output of the balanced modulator 22 may be expressed as a voltage $VM \sin \omega t \sin \mu t$, and the output of the balanced modulator 34 may be expressed as a voltage $VM \cos \omega t \cos \mu t$ where:

$V$ = peak voltage of the signal $S_1$
$M$ = peak voltage of the signal $S_3$
$\omega = 2\pi$ times the frequency $f_1$ of the signal $S_1$
$\mu = 2\pi$ times the frequency $f_3$ of the signal $S_3$
$t$ = time in seconds Combining the outputs of the two modulators 22, 34 will give a new signal $S_4$, of voltage $VM \cos(\omega - \mu)t$, which is the lower side band of the combined signals $S_1$ and $S_3$, and has a frequency $f_4 = f_1 - f_3$. If desired, the upper side band of the signals $S_1$ and $S_3$ could be obtained in a similar manner by arranging the phase shift circuits 26, 28 to produce a phase "lag" of 90° between the input and output sides thereof.

The new signal $S_4$ is next combined with the signal $S_2$ in a modulator or mixer 38, the output of which is connected to a low-pass filter circuit 40. It will be seen that the modulator 38 and the low pass filter 40 together comprise a lower side band output circuit, the output of which will be a new signal $S_5$ having a frequency $f_5 = f_4 - f_2$. The frequency of the signal $S_5$ may now be measured in any desired manner to obtain an indication or other suitable reaction in response to changes in frequency of the signal $S_5$. In the circuit of Figure 2, the signal $S_5$ is applied to a familiar frequency measuring and indicating system comprising a limiter stage 42, a square wave generator 44, an R-C differentiator 46, a diode totalizer 48, and an ammeter 50. As is well known, each positive half cycle of the signal $S_5$ will produce a pulse of current through the totalizer 48, and the ammeter 50 will indicate the average current through the totalizer. As the frequency of the signal $S_5$ increases or decreases, the average current through the ammeter 50 will increase or decrease correspondingly, and therefore the ammeter can be calibrated directly in terms of frequency. In using the system shown in Figure 2 to measure frequency deviation, it is convenient to arrange the meter 50 for center scale deflection at the frequency $f_3$ of the signal $S_3$, and with the meter marked "zero" at center scale. Readings on either side of center scale can be marked as "plus" and "minus" frequency readings, and the magnitude and direction of deviations between the signals $S_1$ and $S_2$ can be read directly from the meter. This may be seen from the following illustrative example in which specific frequencies are assumed for the signals $S_1$ and $S_3$.

It may be assumed that the signal $S_1$ has a carefully controlled frequency of 1000 kilocycles. A signal $S_2$, having a nominal frequency of 1000 kilocycles, is to be compared with the signal $S_1$, any any deviations of the signal $S_2$ above or below $S_1$ are to be noted. It may also be assumed that a maximum deviation of 20 cycles between the signals $S_1$ and $S_2$ is anticipated. The meter 50 will be calibrated to read "−20" when the frequency $f_5$ of the signal $S_5$ is zero, "0" when the frequency of the signal $S_5$ is 20 cycles, and "+20" when the frequency of the signal $S_5$ is 40 cycles, with suitable intermediate readings applied in obvious manner.

In one instance, the frequency $f_2$ of the signal $S_2$ might be 999,980 cycles, or 20 cycles less than the frequency $f_1$ of the signal $S_1$. From Equation 5, the frequency of the signal $S_5$ would then be $f_5 = 999,980 - 1,000,000 + 20 = 0$. Hence the meter 50 would read "−20," indicating that the signal $S_2$ was 20 cycles below the signal $S_1$ in frequency.

In another instance, the frequency $f_2$ of the signal $S_2$ might be 1,000,010. The frequency of the signal $S_5$ would then be $$f_5 = 1,000,010 - 1,000,000 + 20 = 30$$

With this 30 cycle signal, the meter 50 would be deflected a distance corresponding to "10 cycles" beyond center scale, and would read "+10," indicating that the signal $S_2$ was 10 cycles above the signal $S_1$ in frequency. Other deviations in frequency between the signals $S_1$ and $S_2$ would be indicated in a similar manner.

If it is desired to measure unknown frequencies directly by a system of the type shown in Figure 2, the meter 50 could be calibrated to read in terms of the actual frequency of unknown signals $S_2$, instead of in terms of frequency difference as has been described.

As was previously mentioned, either the upper or the lower side band of the combined signals $S_1$ and $S_3$ may be used. In the systems which have been described, it was assumed that the resultant signal $S_4$ was the lower side band of the combined signals $S_1$ and $S_2$. If the upper side band were to be used, Equations 1 through 4 would read as follows:

(1') $\quad f_4 = f_1 + f_3$
(2') $\quad f_5 = f_4 - f_2$
(3') $\quad f_5 = (f_1 + f_3) - f_2$
(4') $\quad f_5 = f_1 - f_2 + f_3$ The differences in algebraic sign between Equations 1 through 4 and Equations 1' through 4' will obviously not alter the mode of operation of a system arranged in accordance with the invention. In a specific system such as that described in connection with Figure 2, for example, it would simply mean that the relative frequencies of two signals $S_1$, $S_2$, as indicated by readings obtained on the meter 50, would be reversed in order of magnitude. Thus, if the lower side band of the signals $S_1$ and $S_3$ was being used, and a reading was obtained which indicated that a signal $S_2$ was higher in frequency than a signal $S_1$ by a given amount, if the upper side band of the signals $S_1$ and $S_3$ were to be used, the same reading would indicate that the signal $S_1$ was higher in frequency than the signal $S_2$ by the same amount. Therefore, either the upper or lower side band of the combined signals $S_1$ and $S_3$ may be used as desired.

It should be noted that the specific phase shifting circuits, modulator circuits, amplifiers, filters, indicators and the like, which are shown in Figure 2, are merely illustrative of many well known devices of their respective kinds which are suitable for use in methods and systems following the principles of the invention. Therefore, the foregoing is to be construed as illustrative, and not in a limiting sense.

What is claimed is:

1. Apparatus for measuring the magnitude and direction of frequency deviations above and below a predetermined frequency of signals of unknown frequency, said apparatus comprising a source of first fixed frequency signals of frequency equal to said predetermined frequency, a source of second fixed frequency signals of frequency at least as large as the maximum expected frequency difference between said first signals and said unknown frequency signals, means coupled to said sources of first and second signals for combining said first and second signals to produce a single side band of the combination of said first and second signals, means coupled to said first named means for combining said single side band with said unknown frequency signals to produce the lower side band of the combination of said unknown frequency signals and said single side band, and a frequency sensitive circuit coupled to the output of said last mentioned combining means to convert said lower side band into a voltage of magnitude representing both the direction and the amount of said frequency deviation.

2. Apparatus as claimed in claim 1, and wherein said single side band is the lower side band.

3. Apparatus as claimed in claim 1, and wherein said circuit comprises a frequency measuring and indicating system.

4. In a device for measuring the magnitude and direction of frequency deviation between a first signal of known fixed frequency and a second signal of unknown frequency variable about said fixed frequency, in combination, a source of second fixed frequency measuring signals having a frequency equal to the maximum expected frequency difference between said first and second signals, means including a balanced modulator for combining said first signal with signals from said source to produce a fourth signal, a circuit for shifting the phase of said first signal by 90°, a circuit for shifting the phase of signals from said source by 90°, means including a balanced modulator combining the outputs of said phase shifting circuits to produce a fifth signal, means for mixing said fourth and fifth signals to produce a sixth signal, means for mixing said sixth signal and said second signal to produce a seventh signal and means for measuring and indicating the frequency of said seventh signal as a measure of said frequency deviation.

5. The method of determining differences in frequency between two signals, one of fixed frequency and one of frequency subject to uncontrolled variation, said method comprising combining said one fixed frequency signal with a third signal of fixed frequency to obtain a resultant signal which is a single side band of the combination of said one signal and said third signal, combining said resultant signal with the other of said two signals to obtain the lower side band of the combination of said resultant signal and said other signal, and measuring the frequency of said lower side band of said resultant signal and said other signal.

6. The method according to claim 5, and wherein said single side band is the upper side band.

7. The method according to claim 5, and wherein said single side band is the lower side band.

OSCAR B. DUTTON.

REFERENCES CITED

The following references are of record in the file of this patent:

UNITED STATES PATENTS

| Number | Name | Date |
|---|---|---|
| 1,773,116 | Potter | Aug. 19, 1930 |
| 1,901,043 | Roosenstein | Mar. 14, 1933 |
| 1,966,230 | Andrew | July 10, 1934 |
| 2,049,712 | Macalpine | Aug. 4, 1936 |
| 2,252,870 | Slonczewski | Aug. 19, 1941 |
| 2,262,149 | Slonczewski | Nov. 11, 1941 |
| 2,358,028 | Peterson | Sept. 12, 1944 |
| 2,393,856 | Collins | Jan. 29, 1946 |